United States Patent [19]
Akai et al.

[11] Patent Number: 5,329,528
[45] Date of Patent: Jul. 12, 1994

[54] DUPLEX COMMUNICATION CONTROL DEVICE

[75] Inventors: Hajima Akai; Hiromichi Ebashi; Takashi Mizumori, all of Tokyo, Japan

[73] Assignee: Yokogawa Electric Corporation, Tokyo, Japan

[21] Appl. No.: 13,502

[22] Filed: Feb. 4, 1993

[30] Foreign Application Priority Data

| Jun. 26, 1992 | [JP] | Japan | 4-169263 |
| Jun. 29, 1992 | [JP] | Japan | 4-170719 |
| Jun. 29, 1992 | [JP] | Japan | 4-170722 |
| Jul. 6, 1992 | [JP] | Japan | 4-178359 |

[51] Int. Cl.$^5$ .................................. H04J 3/02
[52] U.S. Cl. ........................ 370/85.4; 370/13; 370/15; 370/16; 370/24; 370/85.3; 370/85.9; 371/20.1; 371/20.5
[58] Field of Search ............ 370/13, 15, 24, 16, 370/85.3, 85.4, 85.9; 371/8.2, 20.1, 20.5

[56] References Cited

U.S. PATENT DOCUMENTS

| 4,630,265 | 12/1986 | Sexton | 370/85.9 |
| 4,748,560 | 5/1988 | Kataoka | 370/85.9 X |
| 4,825,204 | 4/1989 | Nakamura | 370/85.4 X |
| 4,860,284 | 8/1989 | Brown et al. | 370/13 X |
| 5,128,962 | 7/1992 | Kerslake et al. | 371/20.5 X |

Primary Examiner—Douglas W. Olms
Assistant Examiner—Russell W. Blum
Attorney, Agent, or Firm—Moonray Kojima

[57] ABSTRACT

A duplex communication control device for a communication system comprising a plurality of stations which communicate data therebetween, wherein the stations are connected to a duplexed communication network and each station comprises a bus status list storing information indicating whether the station can communicate over a first or second communication line of the network; a token generating means which carries the newest bus status information on a token frame and transmits the token frame over the communication lines; a list updating means which receives the token frame transmitted over the lines and updates the contents of its own bus status list according to the bus status information carried on the token frame; and a transmission-reception means which selects one or both of the lines according to the bus status list for communication.

10 Claims, 15 Drawing Sheets

Fig.6

| PRA | DA | SA | LG | CTL | BI | CRC |

Fig.7

| L1 | Normal : 1 |
|---|---|
| L2 | At Fault : 0 |

21

DUPLEX COMMUNICATION CONTROL DEVICE

BACKGROUND OF THE INVENTION

1. Field of the Invention

This invention relates to a duplex communication control device used in a communication system comprising a plurality of communication stations and a duplex communication network; and more particularly, to such a device which is capable of being used with a distributed control system, which controls process variables, such as temperature and pressure, in such a communication system wherein the various communication stations communicate with each other by token passing.

2. Description of the Prior Art

A communication system, comprising a plurality of communication stations sharing one communication network, is required to control communications in such a manner that communication between the stations is carried out in an orderly manner.

The token passing type of communication control is well known, and is disclosed, for example in U.S. Pat. Nos. 4,058,681 and 4,491,946, wherein a single token permits each station to serve as a master station and to communicate with other stations, using a communication network. The token is successively passed from station to station in terms of token frames in a predetermined sequence. When one communication station receives this token, it controls the entire communication system, and, when communication is requested, communicates with other stations. When there is no request for communication, the token is sent to the next communication station. The cyclic passing of the token frames is managed according to station addresses intrinsic to individual stations. When token frames are passed to the next station, the token frames are normally sent to the station having a station address which is one larger in number than the station address of the present station.

This token passing type of communication control is advantageous in that it enables efficient use of the communication network. Also, communication control is not centralized. Furthermore, the control is not affected by the length of the communication network. In this way, the token passing type of control has various desired features. Thus, such type of control is widely accepted in process control systems.

In process control systems, which are required by necessity to have high reliability, field control stations assigned to control the process and the communication network to which the field control stations are connected are duplexed. Thus, when one station of the duplex fails, the other station of the duplex operates as a backup.

FIG. 1 shows one example of a conventional communication system comprising a plurality of communication stations ST1, ST2 . . . STn interconnected by a duplex communication network comprising lines BS1 and BS2. In this system, if a trouble or fault occurs at point A in one line BS1, and if the token arrives at station ST1, it is assumed that the station begins to send a token frame toward station ST2, for example, using the first line BS1, at first. Since transmission through line BS1 will be unsuccessful due to the existence of the fault at point A in line BS1, station ST1 then transmits a token frame, using second line BS2. The transmission on line BS2 is successful since there is no fault therein.

When the token is passed to station ST1, station ST1 informs each communication station (ST2 . . . STn) connected by the communication network (comprising lines BS1,BS2) that line BS1 has a fault. On receiving this message, each station (ST2 . . . STn) recognizes the existence of the fault in line BS1 and stops communication through line BS1. Subsequently, communication is continued using line BS2.

The just discussed conventional system has the following problems.

(A) Since station ST1 informs the other stations ST2 . . . STn of the failure in line BS1 when the token is passed again to station ST1 after the failure in line BS1 is detected, the other stations ST2 . . . STn cannot recognize the failure in line BS1 until the token is again passed to station ST1.

(B) If any one station fails to receive the message of the fault, such station will not know of the fault and will continue to act as though such fault did not exist.

(C) If any station does not recognize a line fault, then that station will repeat the operation for detecting line fault whenever the token is passed to that station. The other stations will thus receive repeated failure signals for the same fault. This will cause performance deterioration of the system.

(D) When a line has a fault, if a new station is connected later to the network, then the new station will be unable to recognize the line fault at the time of the later connection.

SUMMARY OF THE INVENTION

Accordingly, an object of the invention is to overcome the aforementioned and other deficiencies and disadvantages of the prior art.

Another object is to provide a reliable duplex communication control device which permits every station connected to the network to recognize failure in one of the lines of the network, with certainty and quickly; and which minimizes any adverse affect on normal communication operation.

A further object is to provide a duplex communication control device which permits a station which is newly connected to the network to quickly recognize the failure state of the network lines without having to adopt complex procedures, and to quickly and smoothly participate in the token passing communication.

A yet further object is to provide a duplex communication control device which prevents a token from being simultaneously held by two stations, such as when the network is disturbed by noise, when the system is set up again, or when the same station address is assigned to two or more stations.

Yet another object is to provide a duplex communication control device which can be readily disconnected from the network when the device itself has a fault, thereby preventing communication between other faultless stations from being adversely affected by such fault.

Another object is to provide a reliable duplex communication control device wherein every station is duplexed and wherein such such control device is capable of self diagnosis during the operating and standby states.

BRIEF DESCRIPTION OF THE DRAWING

FIG. 6 is a diagram depicting a token frame in a transmission frame outputted by the transmission-reception control means of FIG. 5.

FIG. 7 is a diagram depicting the bus status list 21 in each station.

DESCRIPTION OF THE PREFERRED EMBODIMENTS

Figure 1:
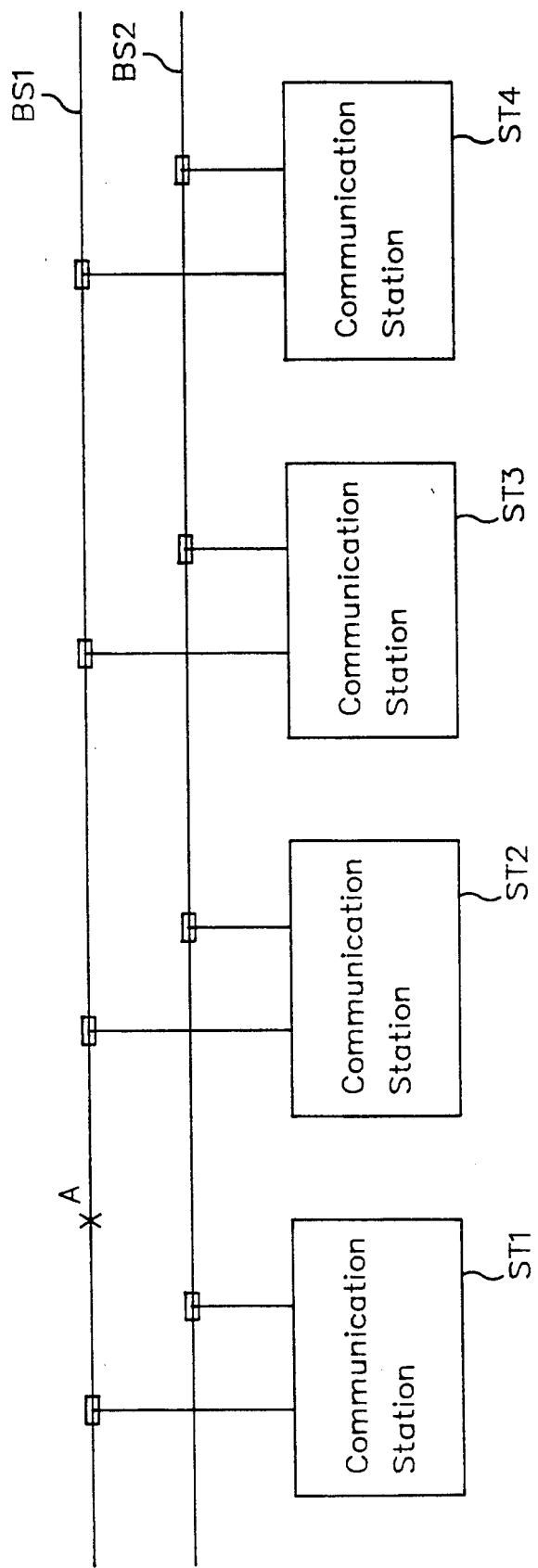
FIG. 1 is a diagram depicting a conventional communication system comprising a plurality of communication stations and a duplex communication network.
Figure 2:
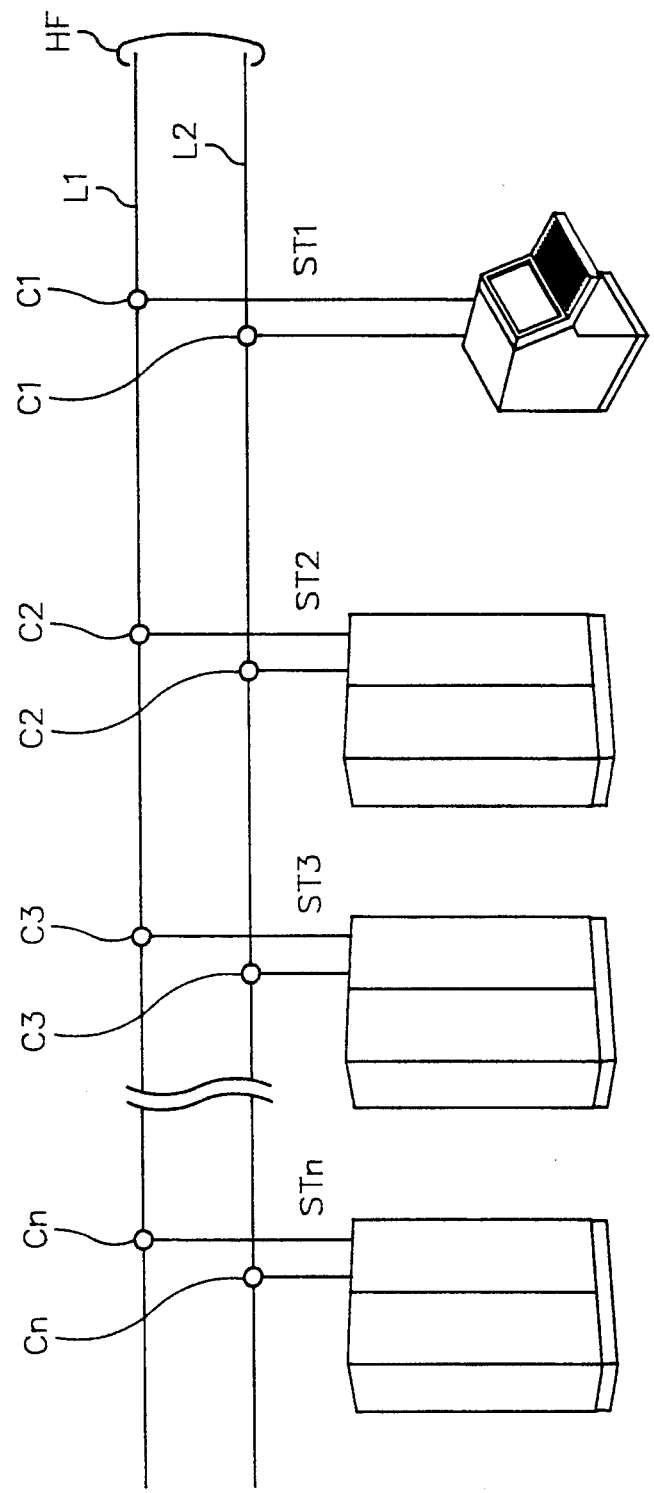
FIG. 2 is a diagram depicting an illustrative embodiment of the invention.

FIG. 2 shows an illustrative communication system, wherein it
is assumed that the communication system is a process control system. A plurality of communication stations ST1 . . . STn, each of which constitutes a unit of communication, are connected to a duplex, bidirectional communication network HF comprising a first communication line L1 and a second communication line L2. Each station STi is coupled to the communication network HF by a pair of couplers Ci(i.e. C1 . . . Cn). Each station is equipped with a communication control device which controls communication by the token passing method.

Station ST1 is used in the example as an operator station which permits a human operator to monitor the entire system. Station ST1 gives instructions about control operations and has a keyboard and a graphic display acting as a man-machine interface. The other stations, such as ST2,ST3, are distributed field control stations and control the process, under the control of the operation station ST1 and under instructions provided by such operator station.

Figure 3:
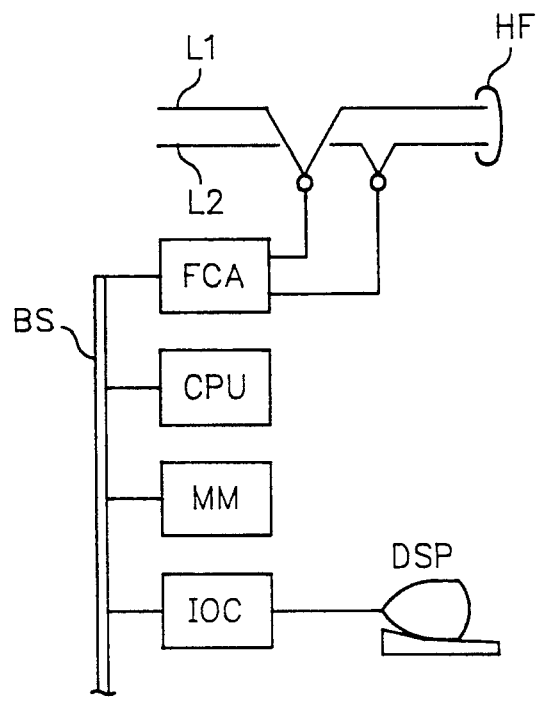
FIG. 3 is a diagram depicting the internal structure of the station, e.g. ST1, of FIG. 2, wherein such station serves as an operator station.

FIG. 3 shows the internal construction of station ST1 of FIG. 2 acting as an operator station, which station ST1 comprises a communication control device FCA, a central processing unit CPU, a main memory unit MM, and an input/output control unit IOC. Device FCA is coupled to network HF via a pair of couplers (not labeled) and connected to processor CPU, main memory MM, and input/output control IOC via an internal bus BS.

Device FCA comprises a processor used only for communication and a peripheral circuit and executes communication processing independent of processor unit CPU at the request of other communication units or other stations. This processing utilizes the known token passing method, i.e. when a token is passed to the station itself, communication processing is performed by the use of network HF. Generally, the term "token" means an authorization to control some item, such as a component or the system. If both lines L1 and L2 of network HF are normal, that is, has no fault therein, both lines L1 and L2 are alternately used, or a predetermined one of the two is used. If one line bas a fault therein, the other normal line is used.

Processor unit CPU performs various Kinds of internal data processing as the operator station. When communication is desired, the CPU prepares a command or data used for communication in a transmission buffer contained in main memory MM, and transmits a communication request to control device FCA according to the type of communication desired. The results of the communication, made under control of control device FCA, are stored in a reception buffer. The CPU utilizes the stored data as the need arises.

A keyboard DSP and a graphic display acting as a man-machine interface are connected to input/output control unit IOC. A typewriter or other devices (not shown) are connected via the input/output control unit IOC.

Figure 4:
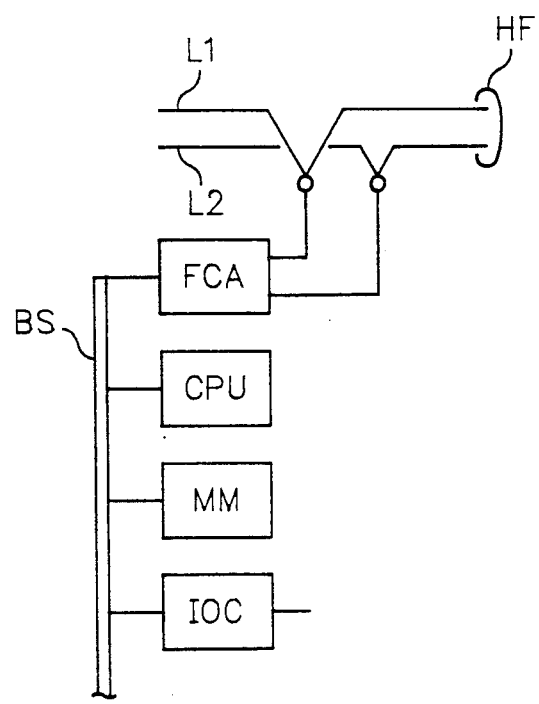
FIG. 4 is a diagram depicting the internal structure of the stations, e.g. ST2 . . . STn, of FIG. 2, wherein such stations serve as field control stations.

FIG. 4 shows the internal construction of stations ST2 . . . STn of FIG. 2 acting as field control stations. The internal structure of these stations is substantially the same as the internal structure of station ST1. Each station comprises a communication control device FCA connected to duplex communication network HF via a pair of couplers, a central processing unit CPU, a main memory MM, an input/output unit IOC and an interconnecting internal bus BS. Actuators, such as sensors and valves installed in the process control devices, are connected to input/output control unit IOC directly or via a field bus (shown as a line).

Figure 5:
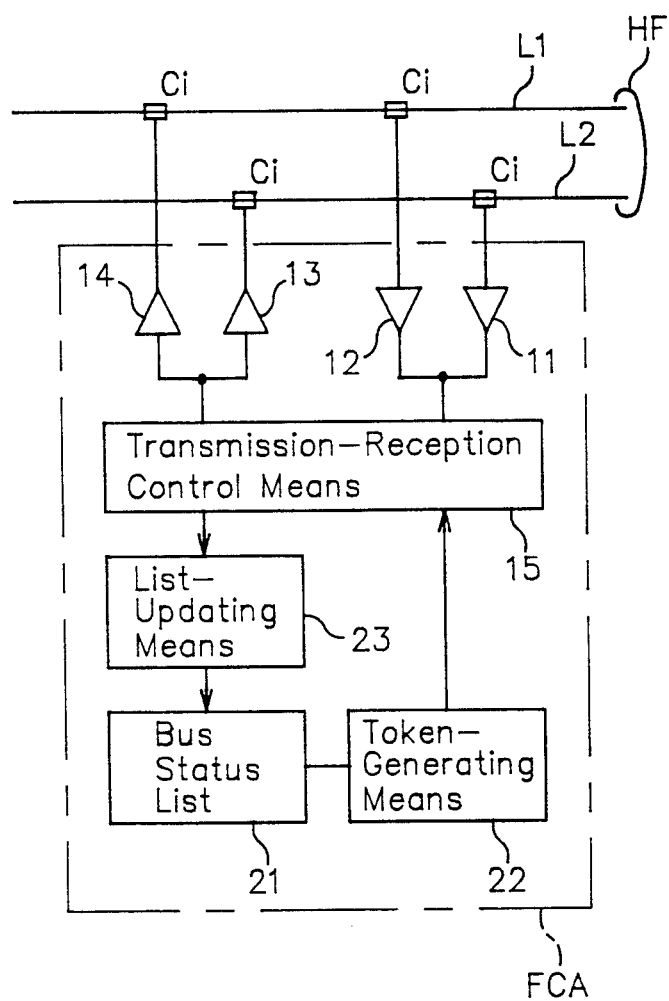
FIG. 5 is a diagram depicting main components of the control device incorporated in the station of FIGS. 3,4.

FIG. 5 shows the main components of the control device FCA of FIGS. 3,4, which are contained in each station STi. Control device FCA comprises receivers 11 and 12, which receive communication frames transmitted over first line L1 and second line L2 of the network HF via couplers Ci. Drivers 13 and 14 output communication frames from device FCA via couplers Ci for transmission through lines L1,L2. Control device FCA further comprises a transmission-reception communication control means 15 which is connected to receivers 11 and 12 and to drivers 12 and 14, and which controls the token passing communication, sends and receives communication frames, checks data, and performs other functions as desired.

A bus status list 21 stores bus status information indicating whether the stations connected to lines L1,L2 can communicate by use of the two lines L1,L2. List 21 is contained in the memory inside control device FCA or may be part of the main memory unit MM. A token generating means 22 serves to transmit a token i.e. an authorization to control the system. When one station holds the token, when a token frame is transmitted to the next station, the token generating means 22 carries the newest bus status information possessed by that one station on the token frame and transmits such token frame. A list updating means 23 receives the token frame transmitted over lines L1,L2 and updates the contents of its own bus status list according to the bus status information carried on the token frame.

When the communication frame is transmitted, the transmission reception control means 15 refers to the bus status list 21. If the information stored in list 21 indicates that none of lines L1,L2 has a fault, then lines L1 and L2 are alternately used or a predetermined line is used. If one of the lines L1,L2 has a fault, that fault containing line is not used and the other faultless line is selected for use. The communication frame is sent over the selected faultless line.

FIG. 6 shows the token frame of the communication frame transmitted by transmission reception control means 15, wherein the token frame comprises a preamble portion PRA, indicating the head of the frame; address information DA being information about the addressed station; address information SA being information about the transmitting station; length information LG being information about the communication frame; control information CTL containing information indicating the kind of token frame and control information for transmitting information; bus status information BI for the newest bus status (i.e. information indicating whether the lines L1 and L2 can or cannot be used); and a check code CRC. One type of token frame is a normal token frame for sending the token only to those stations which presently participate in the communication process. Another type of token frame is a diagnostic token for passing the token to a station which does not currently participate in the communication process, but may participate in future communication.

FIG. 7 shows bus status list 21 (also see FIG. 5) which is incorporated in each station. Data indicating the newest state of each of the lines L1,L2 are stored in the list 21. For example, state 1 indicates that the communication line is normal, while state 0 indicates that the line has a fault. If a line is normal, or in state 1, communication over that line is possible. If a line has a fault, or state 0, communication over that line is not possible. When one station gains a token and sends out a communication frame, that station can know whether the transmission is successful or not, based on the bus status information contained in list 21. The obtained newest information about the bus status is stored in list 21. When one station receives the token, the list updating means 23 (see FIG. 5) updates the contents of list 21 according to the bus status information carried on the token. In this manner, the contents of the bus-status list 21 are updated quickly and changed into the newest bus status information.

Figure 8:
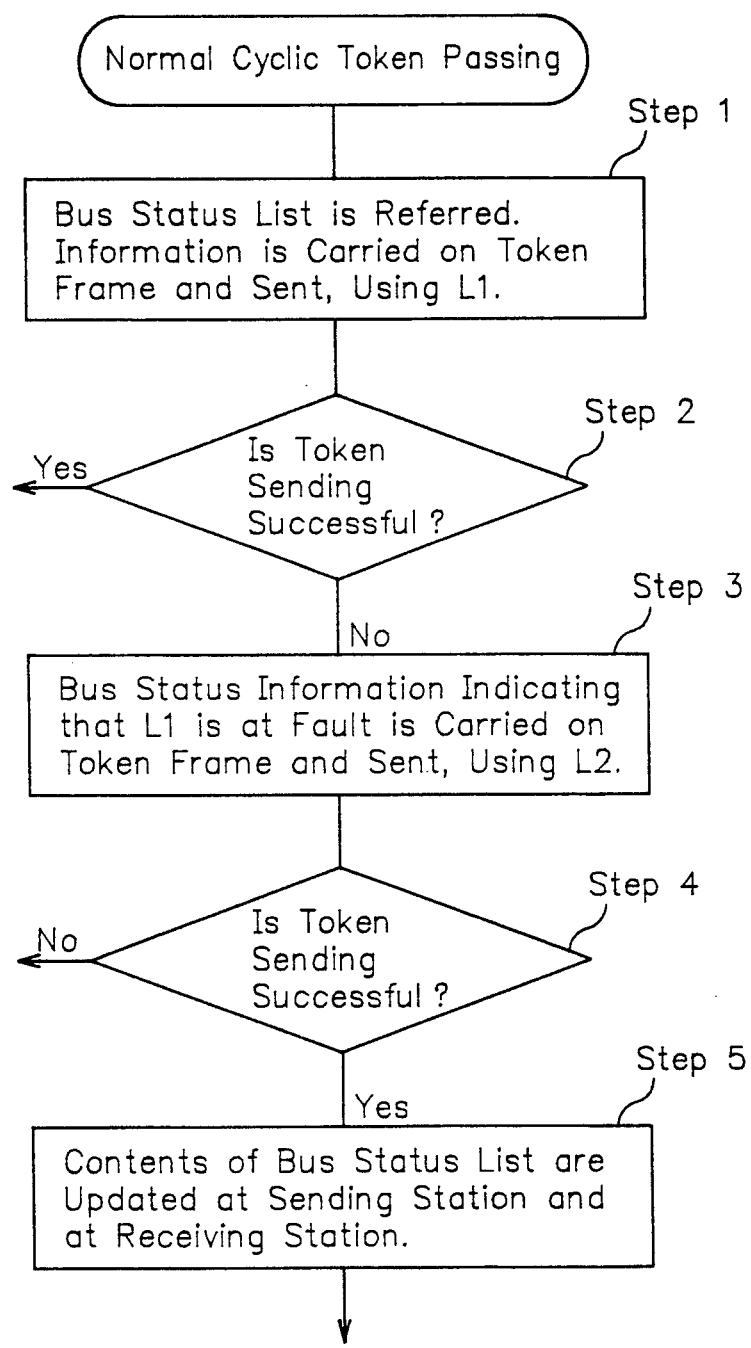
FIG. 8 is a flow chart depicting operation of one station connected to the communication network of FIGS. 2-5.

The operation of the embodiment of FIGS. 5,6 and 7 is next described with reference to the flow chart of FIG. 8 which illustrates operation of one station connected to network HF. For example, at first a token is present in station ST1. Transmission-reception control means 15 refers to its own bus status list 21 (STEP 1). The information is carried on the token frame. A destination address indicates the next station ST2. The information is transmitted over the line, e.g. L1, regarded as normal by the bus status list 21 (STEP 1). A decision is made to see if transmission of the token is successful, by checking the acknowledgement signal from the communicating station (STEP 2). If transmission of the token is successful (YES), then the token is shifted to the addressed station ST2.

On the other hand, if the result of the decision made in STEP 2 is that the transmission is not successful (NO), i.e. no acknowledgment signal is sent from the communicating station, then station ST1 regards the line L1 as having a fault and carries bus status information indicating that line L1 has a fault, on the token. Then, the token is transmitted over line L2 (STEP 3). Thereafter, a decision is made to determine whether the transmission of the token over line L2 has been successful or not (STEP 4).

If the result of the determination is that transmission has been successful (YES), then station ST1 updates the contents of its bus status list 21 so as to indicate that line L1 has a fault. Also, in station ST2 receiving the token, the list updating means 23 updates the contents of its own bus status list 21 and changes such contents into the newest information according to the bus status information (i.e. information indicating that line L1 has a fault) carried on the token (STEP 5).

If there is a request for transmission of data or other communication, station ST2 gaining the token executes the communication operation. Then, station ST2 transmits the token to the next station, or station ST3, over line L2 according to the contents of its own bus status list 21, in the same manner as just described, i.e. the bus status information is carried on the token and transmitted.

By carrying out the just described series of steps, the contents of the bus status lists of the stations are updated so as to represent the newest condition when the token is cycled through the stations participating in the communication process.

If the result of the determination made in STEP 4, on the other hand, is that the transmission of the token over line L2 is not successful (NOT), then a given processing for confirmation is carried out. For example, transmission of the token over line L2 is tried again. A check is made to see if an effective response is not obtained. Similarly, the token is transmitted over line L1. If no response is obtained, then both lines L1 and L2 are judged to have faults. The defective locations are thus detected.

Figure 9:
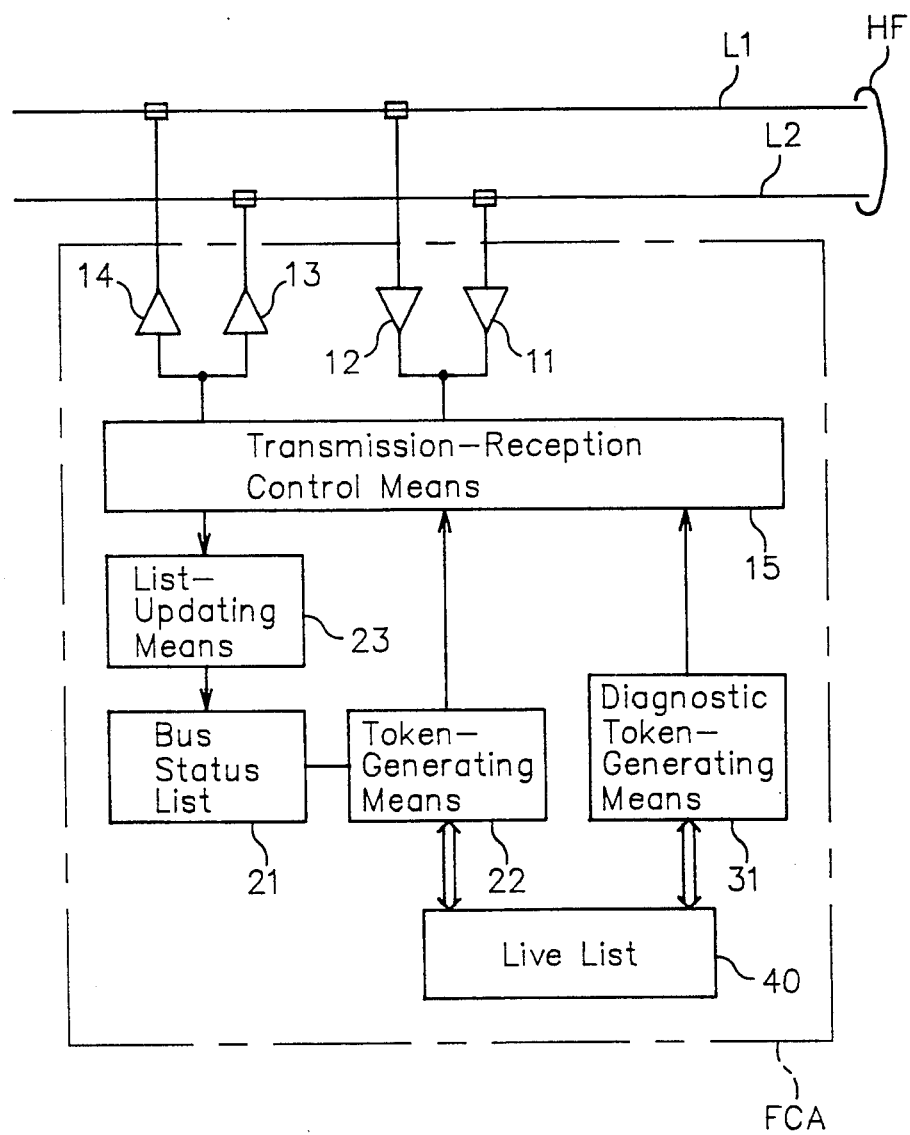
FIG. 9 is a diagram depicting another example of the communication control device of the invention.

FIG. 9 shows another communication control device FCA, wherein each station is equipped with a diagnostic token generating means 31. The diagonostic token generated by diagnostic token generating means 31 causes either a new station connected to line L1 and line L2, or a station whose power supply is turned ON, to participate in the communication. The newest bus status information held by the station itself is carried on the diagnostic token and transmitted.

If list updating means 23 receives the diagnostic token, the updating means 23 updates the contents of bus status list 21 held in the station according to the bus status information carried in the diagnostic token frame.

A live list 40 indicates the state of operation of the stations which have been or will be connected to lines L1 and L2. In this embodiment, each station either participating in the communication or operating is termed an active station. Each station not participating in the communication is termed an inactive station. Live list 40 is updated by receiving information which is transmitted by each station at regular intervals of time and which indicates that the station is in an active condition.

Diagnostic token generating means 31 refers to live list 40 and sends a diagnostic token at regular intervals of time to those stations which are inactive on the list.

Normal token generated by token generating means 31 is cycled through the stations which are active in live list 40.

In this embodiment of FIG. 9, when a new station participates in the token passing communication, the status information on the duplex communication network can be made to be coincident with information about the other stations without need of taking complicated steps.

In the embodiment, the bus status information indicating failure in the network and indicating whether the defective stations have recovered, can be quickly and reliably sent to every station. Deterioration of performance due to erroneous bus status information is prevented. Where the system recovers from failure, it can immediately shift to normal operation of the duplex communication network. Hence, the invention results in a reliable duplexed system.

In the FIG. 9 embodiment, when a new station participates in the token passing communication, advantageously, the information about the status of the network can be made to be coincident with the information about other station without the necessity of taking complicated steps.

Figure 10:
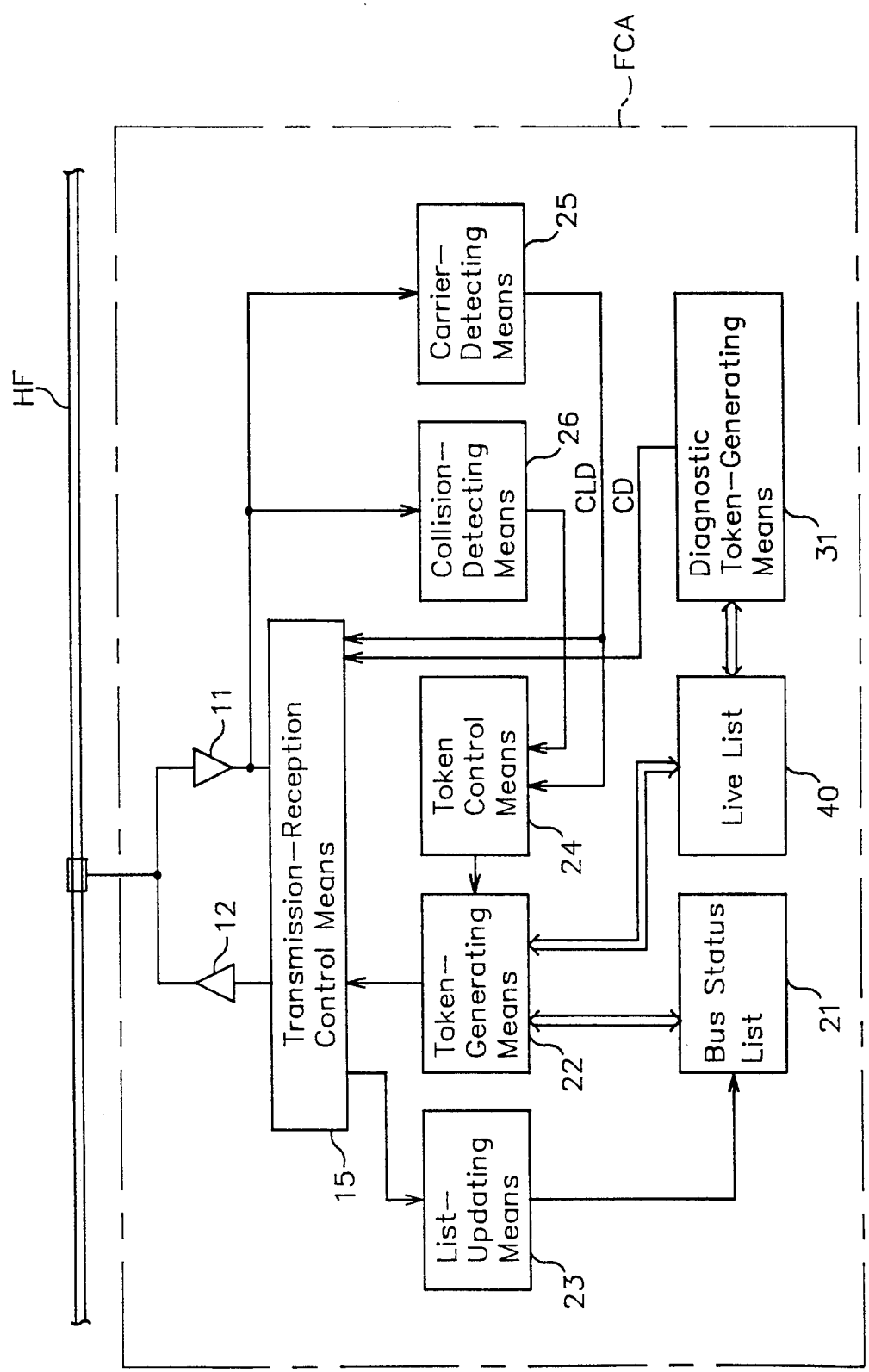
FIG. 10 is a diagram depicting a further example of the communication control device of the invention.

FIG. 10 shows another communication control device, wherein a means is added which eliminates problems which occur when a plurality of token frames, which are symbols of authority, are present on the network HF shared by the communication control devices FCA. The main components of this means are shown in FIG. 10.

In a token passing communication system, it is assumed that only one of a plurality of stations connected to the network HF holds the token. However, if the system is set up again after being disturbed by noise, or if the same station address is assigned to two stations for whatever reason, then the two stations hold the token concurrently. In this situation, it is impossible to control the communication by a normal token passing operation, and thus, the operation of the entire system is adversely affected.

In the FIG. 10 embodiment, means for resolving such problem is added. Communication control device FCA comprises a transmission-reception control means 15 which controls the token passing communication and detects errors. A carrier detecting means 25 receives the signal, for example, on one line L1 via a receiver 11 and detects the presence or absence of a carrier from the signal level on line L1. A collision detecting means 26 similarly receives the signal on line L1 via receiver 11. For example, detecting means 26 monitors the DC component level on line L1, and comprises a comparator which detects variations in the signal level caused when the frame transmitted from this station is superimposed on the frame transmitted from another station.

The station of token generating means 22 receives the token. When this token is held, token generating means 22 transmits the token to the next station under control of a token control means 24. Token control means 24 controls token generating means 22 in such a manner that when output signal CD from carrier detecting means 25 indicating detection of the carrier or the output signal CLD from the collision detecting means 26 is received, the token held by the station is abandoned.

Figure 11:
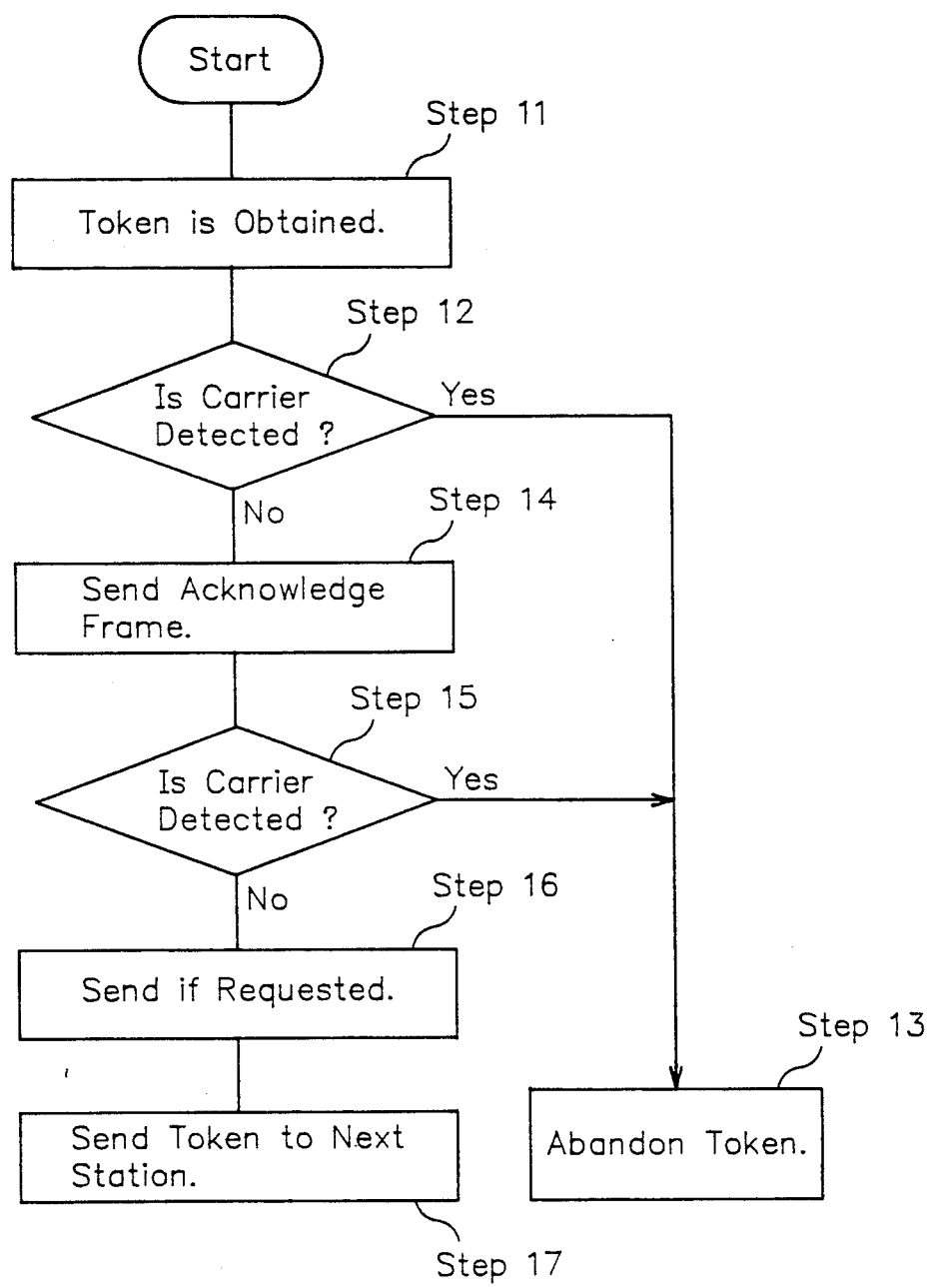
FIG. 11 is a flow chart depicting operation when one station receives the token.

FIG. 11 shows operation when one station having the control device FCA of FIG. 10 has obtained the token. Transmission-reception control means 15 usually monitors the token frame transmitted over line L1 or L2. If the token frame is addressed to the station of the control means, then it obtains the token (STEP 11). Then, carrier detecting means 25 makes a decision to see whether the carrier transmitted over line L1 has been received or not, i.e. to see whether any other station connected to line L1 is sending the carrier or frame (STEP 12).

If the carrier is detected (YES), i.e. if the output signal CD from carrier detecting means 25 is active, token control means 24 determines that another station obtaining the token exists other than the station itself. Control means 24 instructs the token generating means 22 not to generate a token (i.e. instructs token generating means to abandon the token)(STEP 13).

On the other hand, if the result of the decision made in step 12 is that no carrier is detected (NO), transmission-reception control means 15 determines that another station does not have a token, and thus transmits an acknowledge frame (STEP 14).One example of the transmitted frame is an acknowledge frame informing the station sending the token that the token has been received. After transmission of the acknowledge frame, collision detecting means 26 monitors the DC signal level on line L1 via receiver 11 and makes a decision to see whether the frame transmitted by the station itself over line L1 collides with the frame transmitted by another station (STEP 15).

If a collision is detected (YES), i.e. if the output signal CLD from collision detecting means 26 is active, then token control means 24 determines that another station will gain the token. Control means 24 instructs the token generating means 22 not to generate a token, i.e., instructs the token generating means 22 to abandon the token (STEP 13).

Thus, a situation is quickly and reliably detected wherein the station itself transmits a frame and at the same time another station transmits a frame. This situation might not be detected by carrier detecting means 25. A serious situation is thus avoided which would be otherwise caused by the presence of two tokens.

If no collision is detected in STEP 15, (NO), and if there is a request for a given transmission, then this communication operation and processing of commands are performed (STEP 16). When the given communication operation ends, or when there is no request for transmission, token generating means 22 sends a token frame to the next station (STEP 17). This transmission of a token is carried out as illustrated in the flow chart of FIG. 8.

If the token is abandoned in STEP 13, another station keeps holding the token. The communication is effected under the control of this other station.

If a similar collision of frames is detected in another station and the token is abandoned, then it follows that the token disappears from the lines. To allow for this disappearance of the token, the communication control device of the stations are provided with token monitor timers which are set at different times. The token generating means having the set time of the monitor timer run out the earliest transmits a new token. Thus, if the processing for abandoning the token is performed in STEP 13, the token passing operation of the entire system is continued in a normal manner.

In the FIG. 10 embodiment, if two or more stations transmit tokens, then the entire system connected to the network is affected. This situation is quickly detected, and then the tokens are abandoned. Hence, the invention provides a reliable communication control device.

Figure 12:
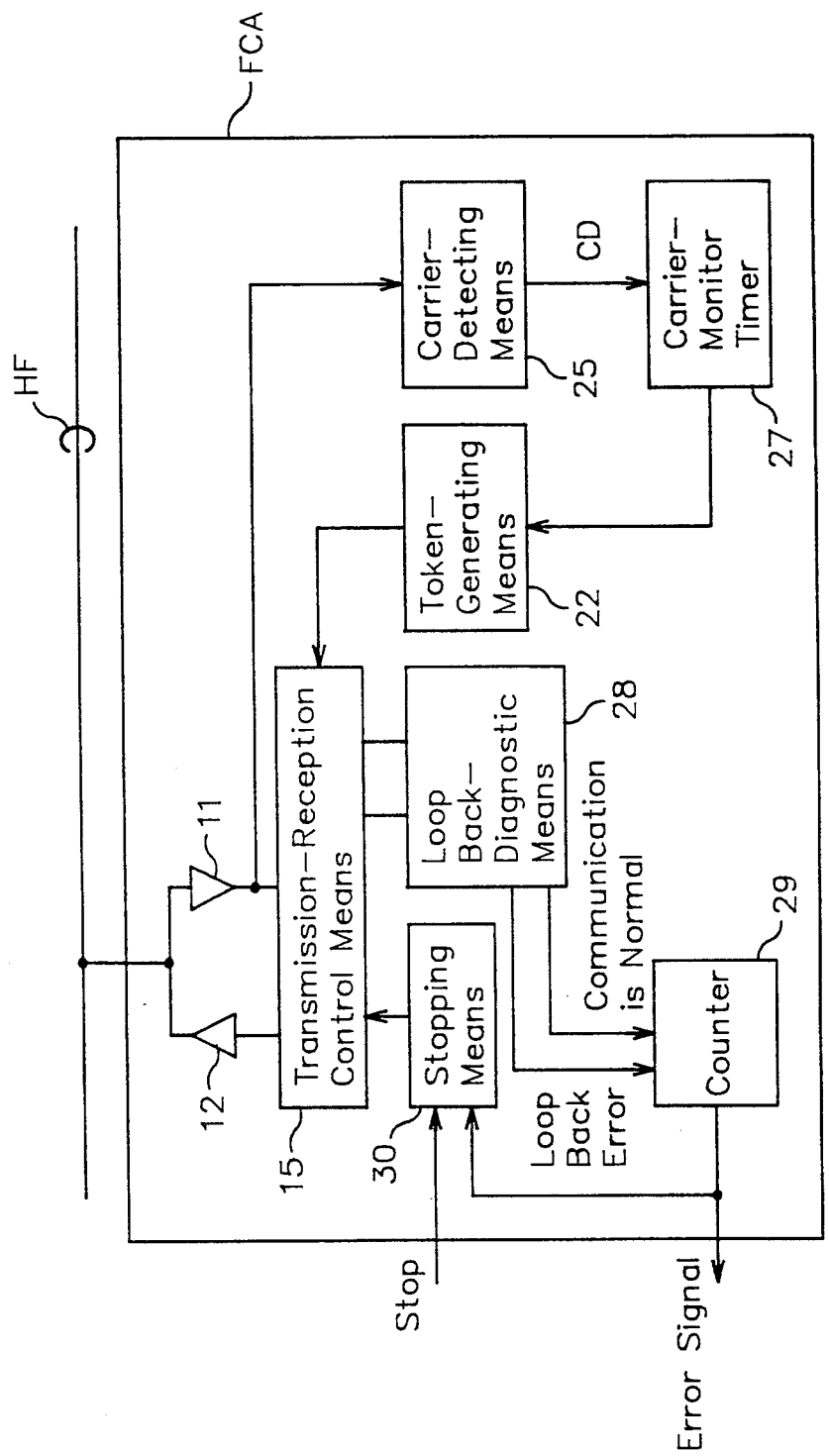
FIG. 12 is a diagram depicting a further example of the communication control device of the invention.

FIG. 12 shows a further example of a communication control device FCA, wherein means are provided for detecting failure which would otherwise affect the entire system and for preventing a defective communication control device from participating in the communication control operation.

In a system which employs the token passing method of control, in order to pass the token smoothly at all times, even if one control device receiving the token loses the token for some reason, such as for example when the power supply is turned OFF, the token must be transmitted to other control devices. For this purpose, the control device FCA of each station is provided with a carrier detecting means 25 for detecting the carrier on network HF, a carrier monitor timer 27 for monitoring the time during which no carrier is detected, and token generating means 22 which generates a new token when no carrier is detected for a given time to which timer 27 is set, i.e. when a signal indicating that timer 27's set time has run out is received from timer 27.

The preset values at which monitor timers 27 of each station are set are made different for the different stations. The minimum value of the preset values is so selected that it is larger than the maximum time during which no carrier exists on network HF during normal operations.

In the FIG. 12 embodiment, even if the token disappears, token generating means 22 of device FCA having monitor timer 27 whose set time runs out the earliest, generates a token again. Consequently, normal communication control is continued.

In this device, if receiver 11 or carrier detecting means 25 has a fault, the carrier on network HF can no longer be monitored. The concerned control device FCA determines that the token has disappeared from the network. Whenever the predetermined time, at which the monitor timer 27 thereof is set, expires, the device FCA generates a token and sends the token to the next station, or to the next control device. This operation is repeated. In this case, if other stations are communicating with each other, the communication is impeded.

To eliminate this problem, the embodiment of FIG. 12 comprises a loop back diagnosing means 28, a counter 29, and a transmission-reception operation stopping means 30. Loop back diagnosing means 28 executes a loop back diagnosis to check whether the transmission and reception function of its own control device FCA is normal or not. Counter 29 counts a loop back error signal transmitted when the loop back diagnosis is made by diagnosis means 28 fails, and produces an error signal when the total count reaches a given value. Stopping means 30 stops the transmission and reception operation of control means 15 according to an error signal from counter 29. An allowable number of loop back operations is previously set in counter 29.

It is assumed that receiver 11 of this device has a fault and is not capable of reception. Under such condition, the device operates in the manner described hereinbelow. The carrier on network HF cannot be detected. Output signal CD from carrier detecting means 25 is made to be inactive. Carrier monitor timer 27 counts the time during which the carrier is not detected. When this measured time reaches the set value, the time up signal is made to be inactive. On receiving the time up signal, token generating means 22 determines that the token has disappeared from network HF and generates a new token. This token is transmitted over network HF via transmission-reception control means 15 and via driver 12, and transmitted to the next station.

However, a response signal or an acknowledge signal to this token cannot be received because of the failure in receiver 11. Hence, control means 15 determines that the transmission of the token is unsuccessful, and repeats the operation for sending the token to the next station. This series of operations is carried out each station connected to network HF, but all of the trials of token transmissions are unsuccessful. During this time interval, communication between the other stations over the network HF is impeded.

Subsequently, control means 15 instructs loop back diagnosing means 28 to execute a loop back diagnosis, to determine whether control means 15 itself has a fault. On receiving instructions for execution of the diagnosis, diagnosing means 28 transmits a communication frame or diagnostic frame addressed to itself over network HF, and carries out loop back diagnosis to determine whether the frame can be correctly received. As a result of the diagnosis, the diagnostic frame addressed to itself can not be received because of the failure in receiver 11. Thus, a loop back error signal is provided to counter 29. On receiving this loop back error signal, counter 29 is incremented.

If the result of loop back diagnosis shows an abnormality, i.e., the failure in receiver 11 is transient and the receiver 11 has recovered from the failure at the time of loop back diagnosis, then a signal indicating normality is produced. Counter 29 is reset.

Carrier monitor-timer 27 runs out of the set time whenever its set value is reached while receiver 11 has a fault. Thus, loop back diagnosing means 28 repeatedly executes the diagnosis. As a result, the value of counter 29 reaches a given value and produces an error signal.

When counter 29 produces the error signal, transmission-reception operation stopping means 30 instructs control means 15 to stop the subsequent operation for transmission and reception. Control means 15 then stops all transmission and reception performed over network HF. Control device FCA of control means 15 is disconnected from network HF. This operation minimizes the effects on the network HF even if receiver 11 or carrier detecting means 25 has a fault and the entire system is affected by the failure.

In the embodiment, it is assumed that transmission-reception stopping means 30 is incorporated in control device FAC. Stopping means 30, however, may also be disposed in an external device such as processor unit CPU. In such case, the external device can easily locate the defective control device FCA.

In the FIG. 12 embodiment, when a failure takes place which would affect the entire system, only the corresponding control device FCA is disconnected from the network HF. Thus, control devices FCA of the other stations can still maintain normal communication. Also, reliability is enhanced.

Figure 13:
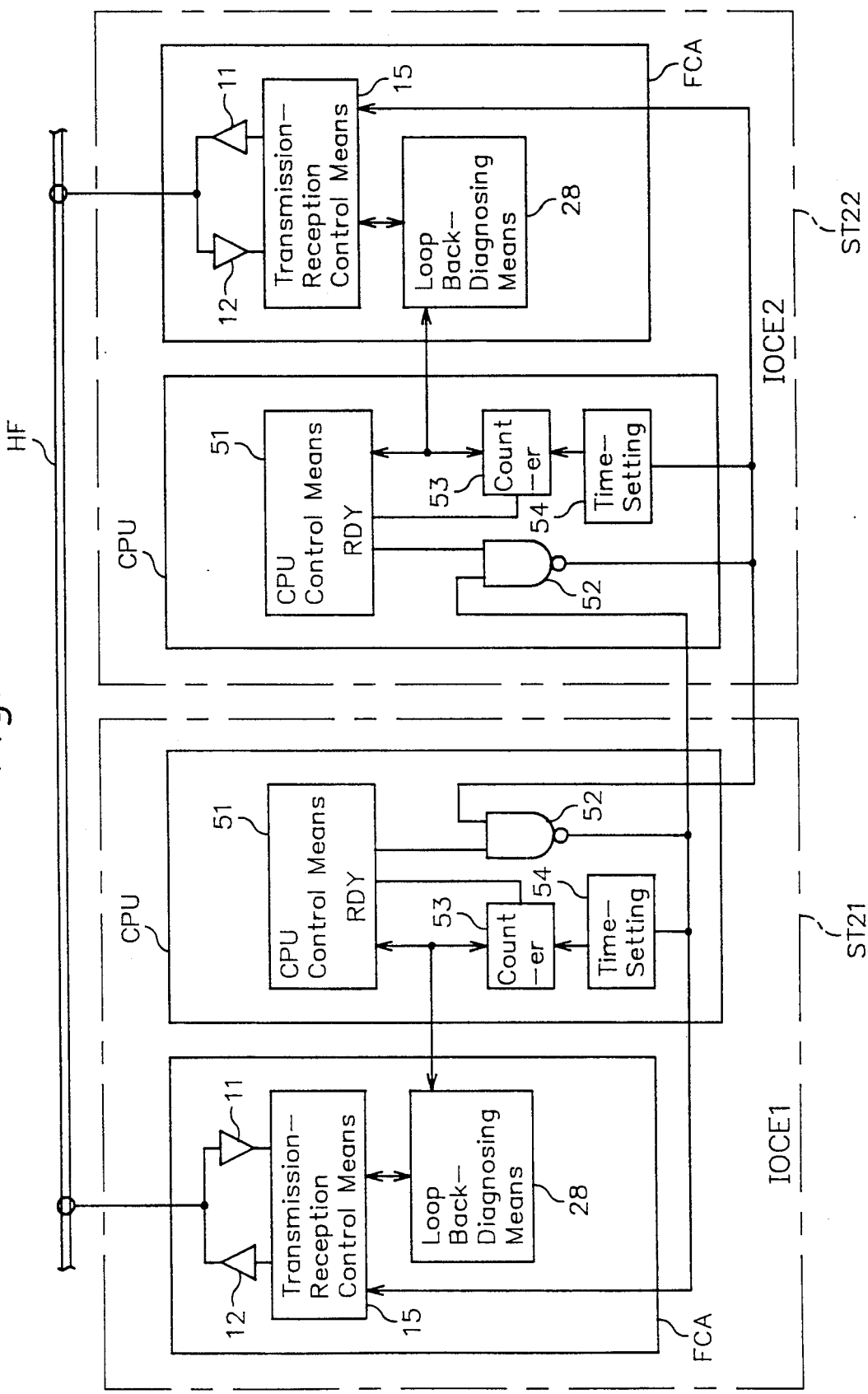
FIG. 13 is a diagram depicting a duplex communication station acting as a field control station.

FIG. 13 shows a duplexed station STi acting as a field control station, wherein a structure is provided which permits each station to correctly diagnose control device FCA of that station.

In the station, acting as a field control station, arithmetic operations for control are assigned to the CPU. A failure in the CPU leads to stoppage of the process control. Thus, the station is duplexed. That is to say, a second unit is provided as a back-up in case of failure of the first unit. When a trouble is detected in each station CPU or in the control device, the other normal or failure free station backs up the defective station.

The method of diagnosing each processing unit itself involves one CPU diagnosing the other CPU to detect a failure. Each control device FCA employs a loop back diagnosis, i.e., a communication frame addressed to itself is transmitted and received to see whether the transmission and reception function is normal.

Where one processor unit diagnoses the other processor unit to detect a failure, it is difficult to locate which of the processor units causes an error if such an error occurs. Where each control device FCA is diagnosed by loop back diagnosis, good results are obtained when both the controlling station and standby station each perform their respective loop back diagnosis. In a token passing type communication control system, one station cannot send information unless it obtains a token. Thus, if the controlling station has a fault, it is impossible to pass the token to the standby station. As a result, the diagnosis in the standby station will otherwise normally be unsuccessful. On the other hand, in the invention because of the means used, the diagnosis is successful.

That is to say, in the FIG. 13 embodiment, the processor unit and control device are duplexed in such a manner that both the operating and standby units are correctly diagnosed by using loop back diagnosis.

In FIG. 13, two stations ST21 and ST22, connected to network HF, serve as field control stations. One station, such as ST21, is engaged in control, while the other, such as ST22, is in a standby condition and prepared for operation in case of failure in the operating station.

Each CPU of the stations ST21, ST22 performs various control operations, arithmetic operations and provides instructions for loop back diagnosis. Control device FCA, coupled to network HF, provides the token passing communication control.

Loop back diagnosing means 28 of each control device FCA executes a loop back diagnosis under instructions from the corresponding CPU. CPU control means 51 of each CPU produces a ready signal RDY indicating that the control means 51 itself is operating, and provides instructions for loop back diagnosis.

Each of the two CPUs has a gate circuit 52 which receives an output signal from the gate circuit of the other CPU and a ready signal from the corresponding CPU control means 51. The gate circuits of the two CPUs provide selecting signals IOCE1 and IOCE2, respectively, for providing duplex control. These two signals IOCE1 and IOCE2 have a mutually exclusive relationship to each other.

The FIG. 13 embodiment is characterized in that a counter 53 is provided which is started at the beginning of a loop back diagnosis and is reset at the end of the diagnosis. A time setting means 54 sets a desired time at which the corresponding counter 53 runs out. This set time is made different between the case when the selecting signal IOCE1 or IOCE2 for duplex control is active and the case when the signal is inactive. For example, if the selecting signal IOCE1 is active and the token exists in this station, a shorter time is set than the time set when no token exists.

The time up signal from counter 53 is applied to the corresponding CPU control means 51. When each CPU control means 51 receives the time up signal from the corresponding counter 53, the control means determines that control device FCA of that station has a fault. Control means 51 causes ready signal RDY outputted from control means 51 to be inactive.

Normal operation of the just describe embodiment and operation performed when the communication function has a fault will now be described Operation Under Normal Condition Gate circuit 52 of each CPU forms a flip-flop activated by ready signal RDY outputted from control means 51. The CPU from which the ready signal RDY outputted from control means 51 is made active earlier, renders selecting signal IOCE1 or IOCE2 for duplex control to be active, and assumes a controlling condition. Since the two selecting signals IOCE1 and IOCE2 have a mutually exclusive relation to each other, the other station is in a standby condition.

Normally, data bases included in the two CPUs are made coincident to each other by separate means (not shown). Also, these two CPUs operate in synchronism. Furthermore, loop back diagnoses are started simultaneously by the CPUs.

It is assumed in the following discussion that the processor unit in station ST21 is in a controlling condition and the processor unit in station ST22 is in a standby condition. Time setting means 54 of station ST21 knows that this station is in a controlling condition, based on the fact that signal IOCE1 for duplex control is active. Setting means 54 sets counter 53 to time T1. Time setting means 54 of standby station ST22 knows that the station is in a standby condition, based on the fact that selecting signal IOCE2 for duplex control is inactive. Setting means 54 sets corresponding counter 53 to time T2. Times T1 and T2, at which the counters are set, are so selected that T2 is longer than T1, i.e., the counter in the standby condition is set to a time which is longer than the time to which the counter in the controlling condition is set.

When the CPU of station ST21 is in the controlling condition, if control device FCA in station ST21 receives a token, loop back diagnosing means 28 executes a loop back diagnosis. At the same time, counter 53 begins to count forward.

The results of the loop back diagnosis are sent to the CPU. If no error is detected, counter 53 is reset before the expiration of the set time. Then, control device FCA in the controlling station passes the token to the control device FCA in the standby station. Then, the control device FCA in the standby station similarly executes loop back diagnosis.

If the CPU in the controlling condition has a fault, ready signal RDY outputted from CPU control means 51 becomes inactive, thereby inverting the state of selecting signal IOCE1 or IOCE2 for duplex control. The token is passed to the CPU in the standby station.

Operation Performed when there is Fault in the Communication Function

Control device FCA in station ST21 and in a controlling condition executes loop back diagnosis, but its acknowledge signal can not be received, for example. A failure in the diagnosis is repeated. Thus, the value of counter 53 in station ST21 reaches its maximum value when a given time T1 has elapsed. In response, CPU control means 51 determines that control device FCA in station ST21 has a fault, and makes ready signal RDY inactive. Also, control means 51 makes selecting signal IOCE1 for duplex control inactive. The token is passed to the CPU in the standby station ST22.

Effects on Standby Station when the Controlling Station has a Fault

When control device FCA in station ST22 has a fault, or when driver 12 has a fault, if the fault occurs immediately after loop back diagnosis, then the diagnosis of the station itself will be successful. However, the token cannot be passed to the control device FCA in standby station ST22. Thus, loop back diagnosis of this station is unsuccessful.

However, failure in the next loop back diagnosis is repeated because the driver in the controlling station has a fault, for example. The time T1, at which counter 53 in controlling station ST21 is set, is longer than time T2, at which counter 53 in standby station ST22 is set. Thus, the counter 53 in station ST21 runs out of set time earlier than the counter 53 in station ST22. Accordingly, if the control device FCA in the controlling station has a fault, the token can be passed to the standby station ST22 with certainty of not being affected by the fault.

Times T1 and T2, at which the times are set according to whether they are in a controlling condition or a standby condition, are selected by taking into account the times required for loop back diagnoses and the processing times of the CPUs, while also maintaining the relation T1<T2.

In the embodiment of FIG. 13, each communication station, equipped with a control device FCA which transfers data by token passing, is duplexed. Each control device FCA is precisely diagnosed. If any of the control devices has a fault, the token can be passed to a standby station without error.

Figure 14:
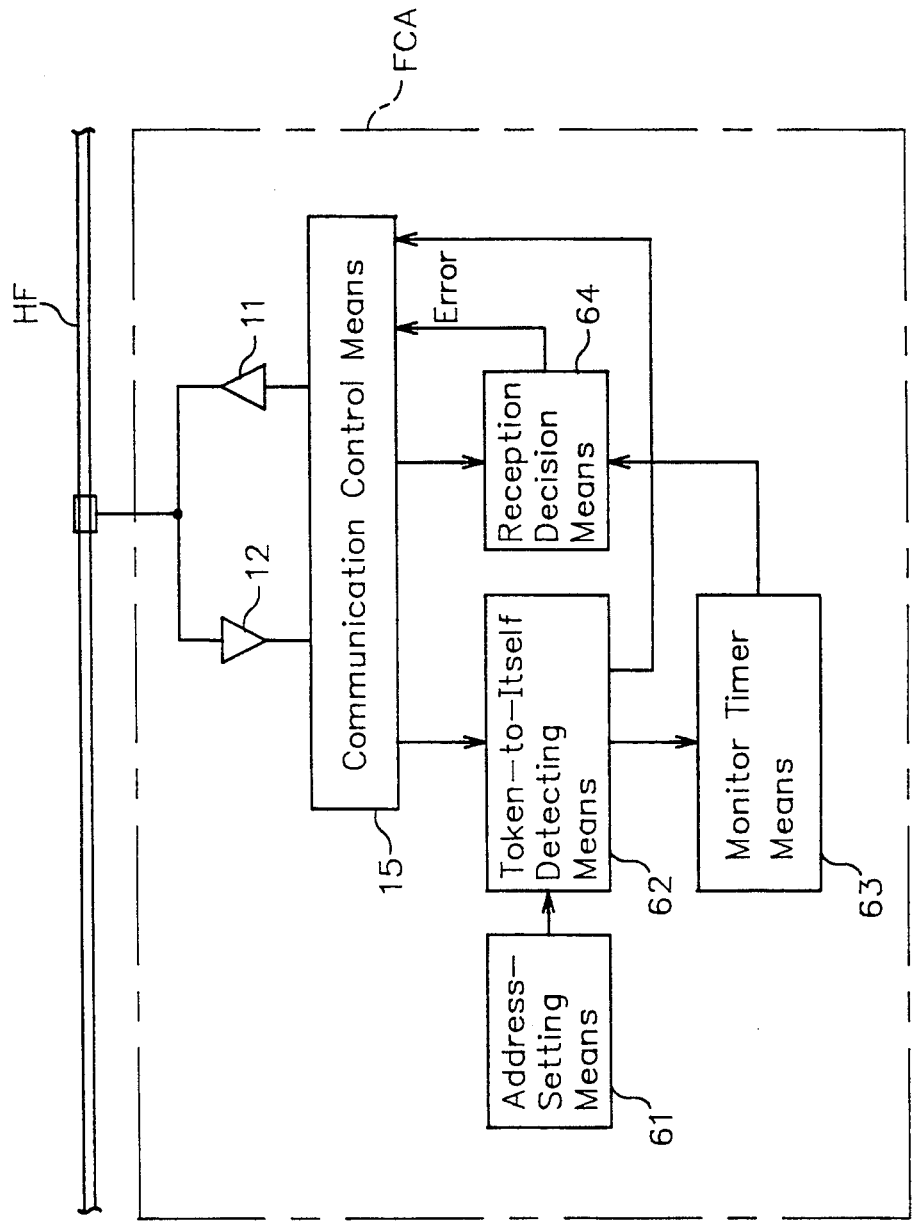
FIG. 14 is a diagram depicting a still further example of the communication control device of the invention.

FIG. 14 shows another exemplary control device FCA. In the token passing type of control, the passing of the token is controlled by station addresses assigned to the stations. When the token is passed to the next station, it is customary to send a token frame to the next station having a station address which is equal to the station address of the present station plus one. This token passing is based on the assumption that only one of a plurality of stations connected to the network holds the token. Thus, if the same station address is assigned to two or more stations, for whatever reason, or if the same address is repeatedly used because of a failure in the address setting means, then the token will be assigned to two stations. In these cases, a collision of token frames will occur in the network. It is impossible to pass the token to all the station in that case. As a result, communication is disabled.

In the FIG. 14 embodiment, to avoid this undesirable situation, an additional function is given to each control device FCA. In particular, when a new station participates in the token processing communication by connecting the station to the network or by turning ON the power supply, the control device checks to determine if any address has been set twice or more.

In the embodiment, an address setting means 61, for setting a station address to specify the station of the control device, may be a mechanical setting means or may take the form of computer software. A token to itself detecting means 62 detects reception of that token from the token transmitted over network HF and receiver 12 which indicates the address of the station set by the address setting means 61. A monitor timer means 63 is set at a predetermined time which is longer than the sum of the transmission delay time and the response delay time. When the token to itself detecting means 62 detects reception of a token addressed to itself, timer means 63 begins to measure time. A reception decision means 64 makes a decision to see whether frames from other stations are received until the time set in monitor timer means 63 runs out. Reception decision means 64 can comprise a circuit for receiving the carrier signal on network HF and a simple logic circuit that detects the reception level.

Reception decision means 64 determines that a double address error has occured when a frame transmitted from another station is received before the set time in monitor timer means 63 runs out. Decision means 64 produces an error signal which is outputted to control means 15. On receiving this error signal, the control means 15 interrupts participation in network HF and abandons the token.

Figure 15:
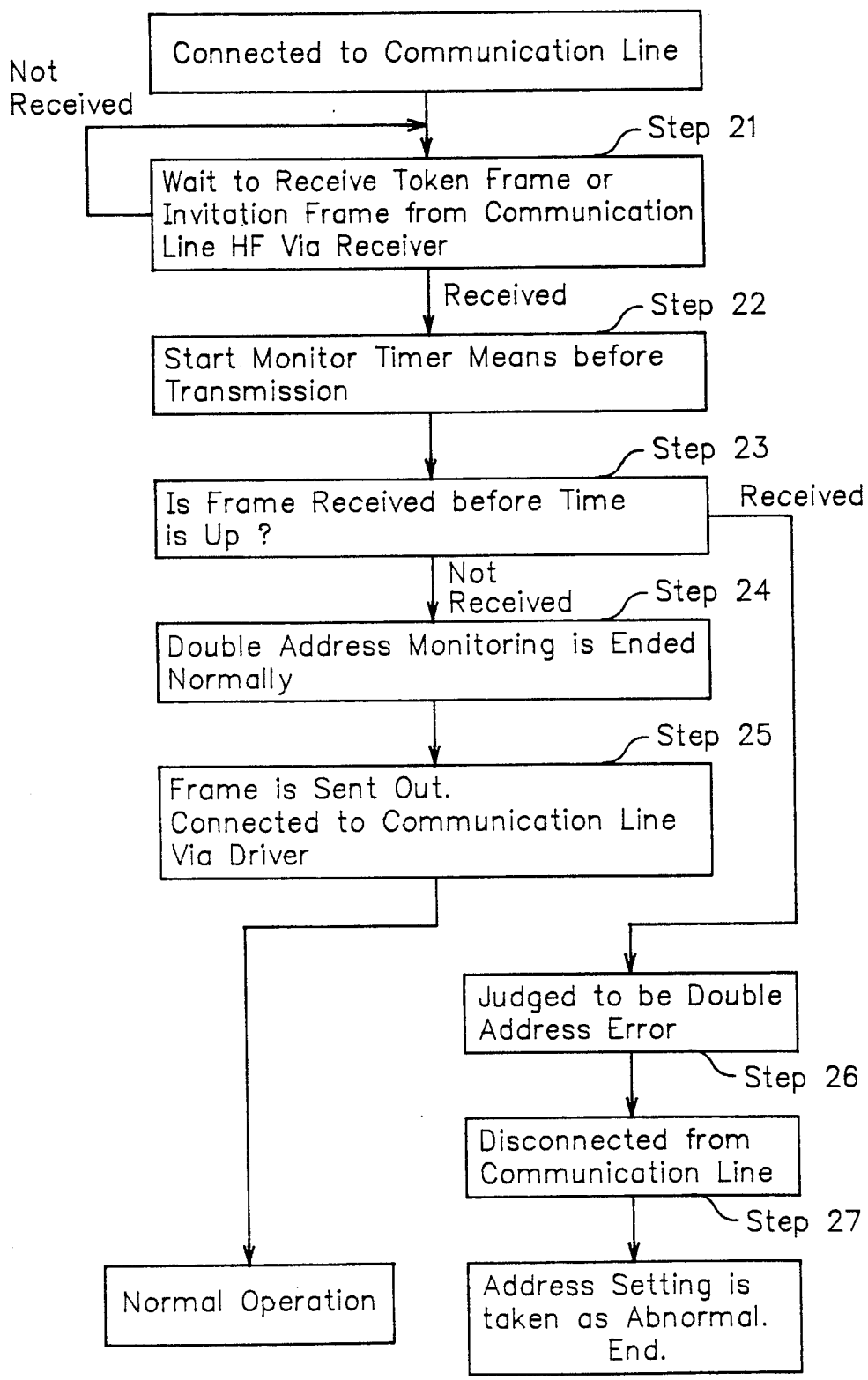
FIG. 15 is a flow chart depicting operation of the station of FIG. 14 connected to network HF.

FIG. 15 illustrates the operational steps when one station is connected to network HF. When the power supply is turned ON or when a new station is connected to the network to participate in the communication (step not labeled), the station waits to receive a token frame or an invitation frame (i.e. a frame passed through all station which might be connected to the network) transmitted over network HF via receiver 12 (STEP 21). To detect the reception of such a frame, token-to-itself detecting means 62 compares the station address assigned only to the present station with the station address contained in the token transmitted over the network HF. If the token is addressed to the present station, then detecting means 62 determines that the reception has been made.

If token-to-itself detecting means 62 receives a token addressed to this station, the monitor timer means 63 is started (STEP 22). Reception decision means 64 makes a decision to determine whether any other station receives a token and responds to it until the time set in timer means 63 runs out (STEP 23). If no frame is transmitted from other stations when timer means 63 runs out of set time (NOT RECEIVED), i.e. reception decision means 64 receives neither the frame nor the carrier transmitted over network HF, decision means 64 determines that no other station having the same station address exists on network HF. The operation for monitoring the possibility of a double address is ended normally (STEP 24).

Subsequently, control means 15 transmits a frame over driver 11 and network HF in response to the reception of the token addressed to this station, and is connected to the network HF (STEP 25). Thereafter, normal operation is performed while connected to network HF.

On the other hand, in STEP 23, if the reception decision means 64 receives a frame or a carrier transmitted over the network HF before a given time elapses (i.e. before the set time of monitor timer 63 runs out), reception decision means 64 determines that another station having the same station address has already existed on network HF (i.e. the frame is transmitted from this station). Decision means 64 determines that a dual address error has taken place and in response produces an error signal which is outputted to control means 15 (STEP 26).

On receiving this dual address error signal, control means 15 interrupts transmission of the frame and disconnects itself from the network (STEP 27). In such case, the situation is taken as an abnormal address setting, and the operation is ended. A message indicating this abnormality is outputted for appropriate display.

When a new station participates in communication by using the network HF, the FIG. 14 embodiment permits the equipment to check whether there exist the same station address as used by any station connected to the network. Thus, if an address should be erroneously set, communication will be prevented from being disabled.

Figure 16:
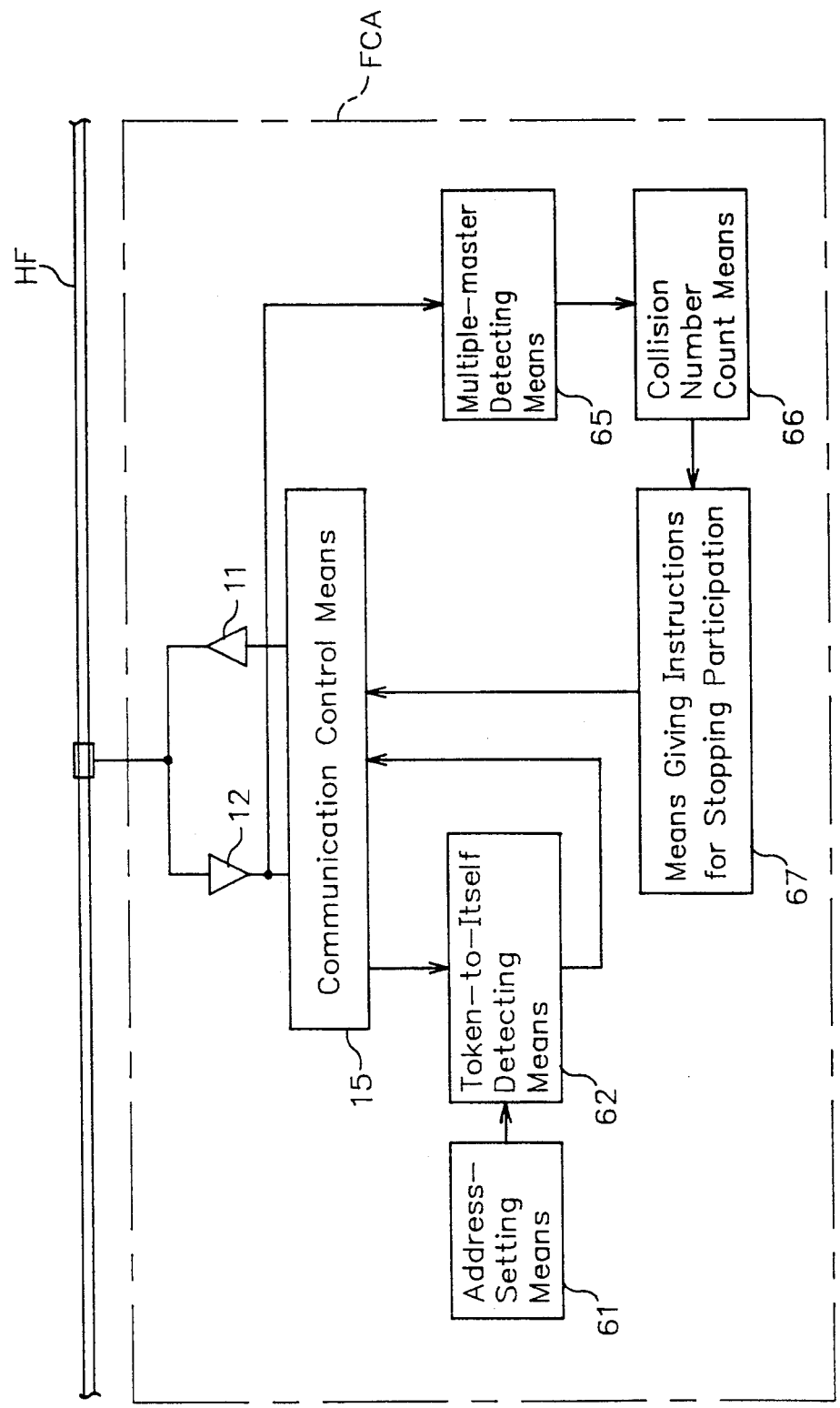
FIG. 16 is a diagram depicting yet another example of the communication control device of the invention.

FIG. 16 shows a further embodiment which is similar to FIG. 14, wherein if the address setting means of one station normally participating in communication breaks down, the resulting trouble is removed. In this embodiment, a multiple master detecting means 65 detects multiple master condition, i.e. frames are being transmitted from other stations when the station of the concerned detecting means 65 gains a token and is transmitting a frame in response to the token. In other words, a plurality of stations acting as masters exists. Multiple master detecting means 65 is a circuit designed to monitor the signal level of the carrier on network HF and detects a change in the signal level caused by collision of frames. A collision number count means 66 is incremented when multiple master detecting means 65 detects a multiple master condition. When the total count obtained by count means 66 reaches a given value, means 67, for giving instructions to stop participation in the communication, determines that a collision of the address of this station with the address of another station or other troubles has occurred. Then, means 67 instructs the communication control means 15 to interrupt participation in the communication.

Figure 17:
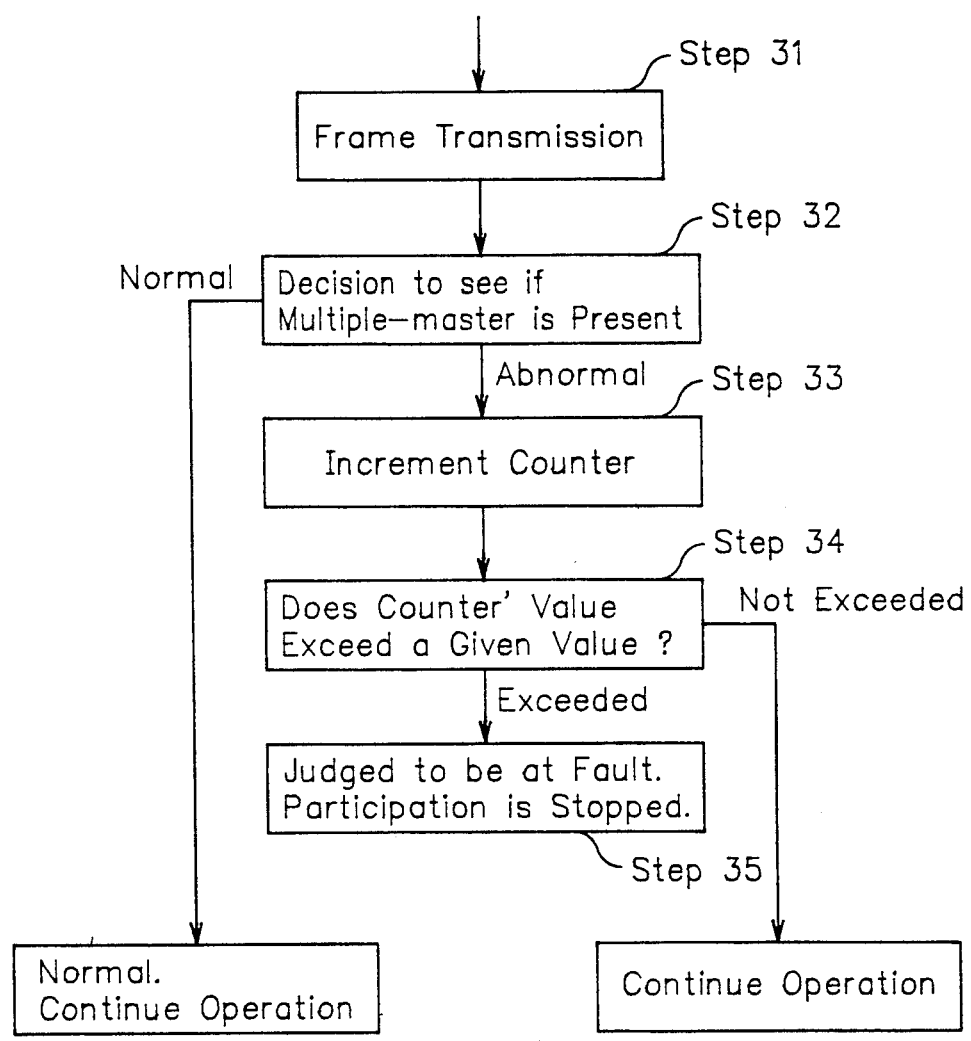
FIG. 17 is a flow chart depiction operation of the embodiment of FIG. 16

FIG. 17 illustrates the operational steps of the embodiment of FIG. 16. When a station obtains a token, control means 15 transmits a frame indicating reception of a token addressed to itself (STEP 31). After transmitting a frame, multiple master detecting means 65 monitors the signal level on network HF. Detecting means 65 holds the token and transmits a frame in response to the token. If a frame is transmitted similarly from any other station, and if both frames collide on network HF, causing a variation in the signal level, then it follows that a multiple master condition has been detected (STEP 32). If a multiple master condition is not detected (NORMAL), the system is regarded as normal, and the operation is continued.

On the other hand, if a multiple master condition is detected (ABNORMAL), the count means 66 is incremented (STEP 33). Means 67 for giving instructions for stopping participation in the communication, checks whether the total value obtained by count means 66 is in excess of a given value (e.g. 3,4, etc.) below which collision due to the existence of a multiple master condition is permissible (STEP 34). If the given value is exceeded (EXCEEDED), the system is judged to have a fault. Means 67 instructs control means 15 to interrupt participation in the communication (STEP 35). If the total count does not exceed the given value (NOT EXCEEDED), the operation is continued as it is.

In the FIG. 16 embodiment, during normal operation, if address setting means 61 breaks down, and if a collision of transmission due to a multiple master condition occurs, then the defective station is disconnected from the network when the number of collisions reach a given value. Consequently, normal communication can be continued between the remaining communication stations.

In the FIG. 16 embodiment, monitor timer means 63 and reception decision means 64 (see FIG. 14) for checking to see whether a double address exists when a new station is connected to the bus, may be omitted or added as desired.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A duplex communication control device for transmitting and receiving data among a plurality of communication stations by passing a token between said plurality of communication stations connected to a first communication line and a second communication line, each of said plurality of communication stations comprising
   bus status list means for storing information indicating whether a station can communicate over said first and second communication lines;
   token generating means for carrying a newest bus status information, indicating whether the communication lines can be used or not be used, on a token frame and for outputting said token frame for transmission over said first and second communication lines;
   list updating means for receiving said token frame transmitted over said first and second communication lines and for updating contents of a bus status list according to the bus station information carried on said token frame; and
   transmission-reception means for selecting a predetermined one or alternate ones of said first and second communication lines for communication when said bus status information contained in said bus status list indicates that a predetermined one or at least one of said first and second communication lines can be used.

2. A duplex communication control device for transmitting and receiving data among a plurality of communication stations connected to a communication network by passing a token therebetween, each of said plurality of communication stations comprising
   carrier detecting means for detecting a carrier on said communication network;
   token frame generating means for transmitting a token frame over said communication network when a token is received and said carrier detecting means detects no carrier for a given period of time while said token is held by said token frame generating means;
   collision detecting means for outputting an output signal indicating a collision when a frame from another communication station is received after transmission of said token frame; and
   wherein when said collision detecting means detects a collision or when said carrier detecting means detects a carrier within a given period of time, the token held by the station is abandoned and the station enters a reception state.

3. The device of claim 2 wherein each of said plurality of communication stations are provided with a monitor time which is set at different times for the different communication stations, the minimum values of the times being larger than the maximum times during which no carrier exists on the communication network during normal operation; and wherein when said carrier detecting means detects no carrier throughout the period of time during which said monitor timer is set, said token frame generating means determines that said token has disappeared from said communication network and transmits a token frame over said communication network.

4. A duplex communication control system comprising
at least two communication stations, each comprising a communication control device and a central processing unit connected to a communication network; wherein said system controls said at least two communication stations so that one communication station is used as a controlling station and the other is used as a standby station according to two signals having a mutually exclusive relation to each other and used for duplex control;
said communication control device comprising a transmission-reception control means for controlling token passing transmission of data, and a loop back diagnosing means disposed in said transmission reception control means for executing a loop back diagnosis under instruction from said central processing unit;
said central processing unit comprising a counter which is started at the beginning of said loop back diagnosis and reset at the end of said loop back diagnosis, and a time setting means for setting said counter at different counter values, depending on whether a station is used as a controlling station or as a standby station; and
wherein when said counter runs out, said communication control device is judged to have a fault, and if such fault occurs in a controlling station, signal for duplex control are inverted.

5. A communication control device comprising a plurality of communication stations, each having respective addresses, said plurality of communication stations being connected via a bus, said communication control device executing communication by passing a token among said plurality of communication stations according to information bout said respective addresses; each of said plurality of communication stations comprising
token-to-itself detecting means for detecting reception of a token addressed to a communication station containing said token-to-itself detecting means;
monitor timer means which is set to a given time longer than the sum of the transmission delay time and the response delay time, for detecting reception of a token addressed to said station and for then measuring time after such detection;
reception decision means for deciding whether a frame from another station is received before the time set in said monitor time means runs out; and
wherein when a frame is received before said time in said monitor timer runs out, said reception decision means determines that a double address error has occurred, and said station is then disconnected from said bus.

6. A communication control device comprising a plurality of communication stations each having assigned thereto a respective address, said plurality of communication stations being connected via a communication network, said communication control device executing communication by passing a token between said plurality of communication stations according to information about said respective addresses; each of said plurality of communication stations comprising
token-to-itself detecting means for detecting reception of a token addressed to its corresponding station;
multiple master detecting means for transmitting a frame when said token-to-itself detecting means receives a token addressed to said corresponding station, and then for detecting a collision of frames on said communication network to thereby detect a multiple master condition; and
collision number counting means for counting the number of detections of multiple master conditions and for instructing the corresponding station to disconnect itself from said communication network.

7. A duplex communication control device for transmitting and receiving data among a plurality of communication stations by passing a token between said plurality of communication stations connected to a first communication line and a second communication line, each of said plurality of communication stations comprising
bus status list means for storing information indicating whether a station can communicate over said first and second communication lines;
token generating means for carrying a newest bus status information on a token frame and for outputting said token frame for transmission over said first and second communication lines;
list updating means for receiving said token frame transmitted over said first and second communication lines and for updating contents of a bus status list according to the bus status information carried on said token frame; and
transmission-reception means for selecting one of said first and second communication lines for communication according to said bus status list; wherein
said transmission-reception means selects a predetermined one of said first and second communication lines for communication when said bus status information contained in said bus status list indicates that both said first and second communication lines can be utilized.

8. A duplex communication control device for transmitting and receiving data among a plurality of communication stations by passing a token between said plurality of communication stations connected to a first communication line and a second communication line, each of said plurality of communication stations comprising
bus status list means for storing information indicating whether a station can communicate over said first and second communication lines;
token generating means for carrying a newest bus status information on a token frame and for outputting said token frame for transmission over said first and second communication lines;
list updating means for receiving said token frame transmitted over said first and second communication lines and for updating contents of a bus status list according to the bus status information carried on said token frame; and
transmission-reception means for selecting one of said first and second communication lines for communication according to said bus status list; wherein
said transmission-reception means selects alternately said first and second communication lines for communication when said bus status information contained in said bus status list indicates that both said first and second communication lines can be utilized.

9. A duplex communication control device for transmitting and receiving data among a plurality of communication stations by passing a token between said plurality of communication stations connected to a first communication line and a second communication line, each of said plurality of communication stations comprising bus status list means for storing information indicating whether a station can communicate over said first and second communication lines;

token generating means for carrying a newest bus status information on a token frame and for outputting said token frame for transmission over said first and second communication lines;

list updating means for receiving said token frame transmitted over said first and second communication lines and for updating contents of a bus status list according to the bus status information carried on said token frame; and transmission-reception means for selecting one of said first and second communication lines for communication according to said bus status list; wherein each of said plurality of communication stations comprises transmission control means for providing control of token passing communication using a duplex communication network; and a processor unit coupled to said transmission control means via an internal bus; and wherein said transmission control means processes communication independently of said processor unit when a token is passed to a communication station and that communication station receiving the token or other stations request communication.

10. A duplex communication control device for transmitting and receiving data among a plurality of communication stations by passing a token between said plurality of communication stations connected to a first communication line and a second communication line, each of said plurality of communication stations comprising bus status list means for storing information indicating whether a station can communicate over said first and second communication lines;

token generating means for carrying a newest bus status information on a token frame and for outputting said token frame for transmission over said first and second communication lines;

list updating means for receiving said token frame transmitted over said first and second communication lines and for updating contents of a bus status list according to the bus status information carried on said token frame; and transmission-reception means for selecting one of said first and second communication lines for communication according to said bus status list; wherein each of said plurality of communication stations comprises diagnostic token generating means for carrying a diagnostic token on a newest bus status information and for transmitting said diagnostic token, said diagnostic token being used to cause a new communication station to be connected to said first and second communication lines to participated in communication; and wherein said list updating means updates contents of its own bus status list according to said bus status information carried on a diagnostic token frame provided upon receipt of said diagnostic token.

* * * * *